Figure 1:
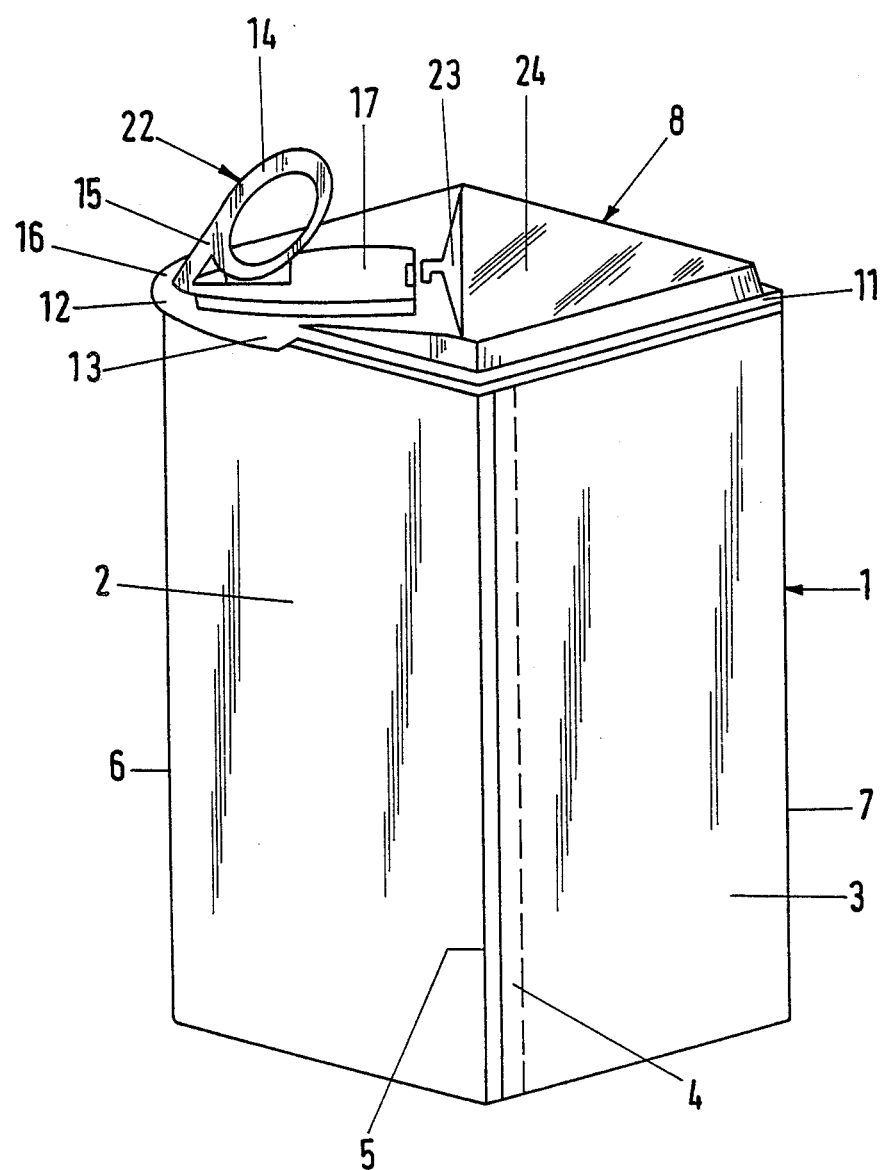

United States Patent [19]

Reil

[11] Patent Number: 4,895,298

[45] Date of Patent: Jan. 23, 1990

[54] QUADRANGULAR SHAPED CONTAINER FOR FLUIDS

[75] Inventor: Wilhelm Reil, Bensheim, Fed. Rep. of Germany

[73] Assignee: Tetra Pak Finance & Trading S.A., Pully, Switzerland

[21] Appl. No.: 232,702

[22] Filed: Aug. 16, 1988

[30] Foreign Application Priority Data

Aug. 19, 1987 [DE] Fed. Rep. of Germany ....... 3727589

[51] Int. Cl.$^4$ .................. B65D 17/32; B65D 43/24
[52] U.S. Cl. .................. 229/125.01; 220/269; 220/335
[58] Field of Search ............. 229/125, 125.01, 125.14, 229/106, DIG. 5; 220/269, 270, 335, 339

[56] References Cited

U.S. PATENT DOCUMENTS

| | | | |
|---|---|---|---|
| 765,888 | 7/1904 | Harbeck | 229/125.14 |
| 2,132,666 | 10/1938 | Williams | 229/DIG. 5 |
| 2,328,579 | 9/1943 | Pelosi | 229/5.5 |
| 2,657,848 | 11/1953 | Norden | 229/125.14 |
| 2,926,832 | 3/1960 | Negoro | 229/125.14 |
| 3,083,858 | 4/1963 | Biedenstein | 220/27 |
| 3,135,451 | 6/1964 | Bauder et al. | 229/5.5 |
| 4,268,336 | 5/1981 | Piltz et al. | 156/244.13 |
| 4,516,689 | 5/1985 | Barker | 220/269 |
| 4,669,640 | 6/1987 | Ando et al. | 220/335 |
| 4,718,598 | 1/1988 | Pupp et al. | 229/52 A |
| 4,795,065 | 1/1989 | Ashizawa et al. | 220/269 |

FOREIGN PATENT DOCUMENTS

1535653 12/1978 United Kingdom .
1555748 11/1979 United Kingdom .
2174672 11/1986 United Kingdom .

*Primary Examiner*—Stephen Marcus
*Assistant Examiner*—Jes F. Pascua
*Attorney, Agent, or Firm*—Howard M. Ellis; Michael L. Dunn

[57] ABSTRACT

Described is a container for liquids with a tube (1) formed by a longitudinal sealing weld (4), at the ends of which bottom and lid (8) are arranged. The lid (8) consists of thermoplastic material without supporting material and is attached by injection moulding to the tube 1 along its upper edge. Furthermore, the lid (8) is provided with a pouring device (22), whereby the tube 1 consists of cardboard covered on both sides with thermoplastic material, the bottom is quadrangular and is formed as folded closure from the folded tube (1) of the container. To facilitate easier opening and that preferably the closing cap can be kept open, but can also be closed again, the invention envisages that the tube (1) has a quadrangular cross-section along its total height, that the paper fibres of the cardboard are arranged crosswise to the longitudinal sealing weld (4), that the latter is arranged close to an edge (5) of the tube (1), that the lid (8) is quandrangular when viewed from above and the pouring device (22) with molded-on handle 14 is arranged within the quadrangular outer contour of the container.

14 Claims, 7 Drawing Sheets

QUADRANGULAR SHAPED CONTAINER FOR FLUIDS

DESCRIPTION

The invention concerns a container for filling with liquid products, formed by means of a tube with a longitudinal sealing weld, at the end of which a bottom and lid are attached, and the lid consists of a thermoplastic material without supporting material, which is attached by injection molding along the upper edge of the tube, and is equipped with a pouring device, whereby the tube consists of a supporting material, i.e. cardboard, which is covered at least on one side with a thermoplastic material, and whereby the bottom is quadrangular and is formed as a folded closure from the folded-over tube of the container.

This type of container is known and has, when viewed from above, either a round or triangular lid. The most developed types are containers with round lids when viewed from above, because the injection molding tools used for the moulding of a round lid to the upper edge of the tube can be easier manufactured by round tools.

The general problem regarding containers for fluids stems on the one hand from a question of density and on the other hand with regard to good opening facilities for the end user, whereby the aim is directed towards cheap manufacturing processes. Injection molds, as far as they can be shaped, can have the most different shapes, and therefore countless versions of pouring devices are known, which are molded on to a lid consisting of thermoplastic material without supporting material. The manufacturer prefers thin plastic surfaces, because this will make the lid cheaper. Because of unavoidable distribution problems it is preferred to shape lids and bottoms in the same fashion, or at least for them to have at least partially flat surfaces, which are equally pliable and elastic when the walls of the lids are produced equally thin. This is not desirable for stacking due to the danger of denting and it does not enhance the opening of the pouring device. The known pouring devices often have a closing cap with a molded on handle and are supposed to be opened by the end user by means of this handle.

The known containers with the round lid, while having a pouring device near their outer edge, the opening of these is difficult, especially because there is no fixed, stiff and clearly defined area at the mold between the handle and the closing cap, neither on the lid nor on the adjoining tube, to which the forces for first time opening can be directed. Mostly there exists a great elasticity of the material, which causes the tearing open to be difficult and inexact, because the areas next to where the force originates are too pliable.

Apart from the fact that the known containers with round lids also have a round tube in the area of the lid and therefore do not make efficient use of space, especially during distribution (transport), and many closing caps of known containers can be torn off completely and are lost, so that the re-closing becomes more difficult; or with a closing cap held fast by means of a strap, it becomes more difficult to re-insert this into the torn opening and at least a locking-in for a good re-closure is hardly guaranteed. Finally, one has found with the existing containers, that often a defined pouring stream cannot be obtained, because the pouring edges can only be seen on special versions of the pouring opening and this is especially difficult in the case of round lids.

The invention therefore is based on the task to equip the known containers with such improvements so as to facilitate easier opening, preferably so that the closing cap can be kept open and then can be held in a definite position for re-closing and to have the means to re-insert the closing cap securely into the pouring opening and to keep it in place. Furthermore, the pouring opening should be able to be re-closed as tightly as possible, mainly to safeguard the remaining contents of the container and also to obtain a definite pouring stream.

In solving the above mentioned task, the invention is characterised in that the tube has a quadrangular cross-section over its total height, the paper fibers of the tube material are arranged crosswise to the longitudinal sealing weld, that the longitudinal sealing weld is placed near an edge of the tube, that the lid is quadrangular when viewed from above and the pouring device with its moulded-on handle is arranged within the quadrangular outer contours of the container.

As opposed to the known containers with round lid, due to the quadrangular shape of the new lid as viewed from above and when retaining the quadrangular bottom as viewed from above, then the tube will have a quadrangular cross-section over its total height. The expert will recognise at once that this offers an excellent distribution facility and efficient use of space during transport and storage. Hereby it is unimportant whether, depending on the design type of the invention, the tube is square or rectangular. The manufacture of injection molding tools for the attaching of the quadrangular lid to the edge of the tube is possible without causing undue technical problems. It is also possible to equip the pouring device of the invention with a molded-on handle, such as in the case of known lids which are round when viewed from above, and then arrange this within the outer contour of the finished container, i.e. after filling and closing before transport and storage.

Also the tube of the known containers have a longitudinal sealing weld. This extends from bottom to lid and can, for example, be made by overlapping. Next to the free end edge or cut edge of the one side of the tube the strip extending along over the whole height of the tube of the other side is fastened, normally by longitudinal sealing, and preferably with protection for the edge at least towards the inside of the container, so that fluids cannot penetrate into the cut edge and therefore into the paper fibres and cannot damage the longitudinal sealing weld here. It is understood that in the area of the longitudinal sealing weld a certain stiffening of the tube is experienced, mainly due to the double-walled cardboard strip. If this is placed as per the principle of the invention near an edge of the tube with its quadrangular cross-section, then this edge will be especially strengthened, particularly in the direction of the plane where the double cardboard strip is situated. Any pressure in this plane on the tube edge will experience a strong resistance; In other words, the container is pressure resistant, stiff and easily manageable in the direction of the plane with the longitudinal sealing weld.

The average user will use the right hand in order to pour the contents of the container of this invention, whereby he will hold the container between the thumb on the one side and the four fingers of his hand on the other side. Due to the quadrangular cross-section of the tube over its total height, a good stiffness of the container for the end user is achieved, especially for pouring.

According to the invention, this stiffening is further improved in that the paper fibres of the tube material are arranged crosswise to the longitudinal sealing weld, that means approximately in the direction of the cross-section plane of the tube. If one considers the gripping movement of the user, then the experts will understand the advantages of the increased stiffening of the container material and also of the improved pouring facility.

A further useful development of the invention is envisaged, in that the pouring device, which is situated in one corner and in a depression of the lid and has a closing cap, is shaped approximately oval and then clearly tapers down to a point to form a pouring opening, the point lying close to the corner of the lid. To obtain a defined pouring stream (good pouring), the pouring device and especially its pouring opening is arranged in one corner of the quadrangular lid in such a way, that the point of the pouring opening reaches as far as possible into the corner. If the pouring opening furthermore lies in a depression of the lid without that, in the case of an especially preferred design, the pouring opening is fitted with a rim or collar on the outside, then the hygience of the new pouring device is improved, because any contents of the container will generally always run or trickle to the lowest point and will therefore return by itself to the pouring opening.

According to the invention, it is further advantageous, if the longitudinal sealing weld is arranged near that tube edge which lies next to the tube edge under the point of the pouring opening. The handling of the container when pouring is improved by this characteristic because of the strengthened tube, i.e. there, where the longitudinal sealing weld lies near the tube edge, comes to lie near the thumb, where the user exercises the greatest pressure on the tube. In case of a right-handed person, as the user is normally considered to be, the tube edge strengthened by the longitudinal sealing weld lies right next to that tube edge which is under the point of the pouring opening. In other words: If one looks from above on to the quadrangular lid, then the point of the pouring opening lies over the one tube edge and the tube edge next to it with the longitudinal sealing weld then lies in anti-clockwise direction beside it (in case of left-handed users in clockwise direction). One can recognise the creation of an easy opening device with easy pouring facility as per the invention.

It is further advantageous, according to the invention, if the handle with the closing cap is connected to the point of the pouring opening by means of a strap at the point of closing cap which can be folded over to the flat surface of the closing cap. A good opening device must also facilitate easy opening of same. According to the invention, these opening forces are channelled from the handle via the strap to an area which lies in the point of the closing cap and this is near the point of the pouring opening. The tearing forces come into play at the point of the closing cap near the point of the pouring opening. The expert knows that tearing forces directed to a point will with certainty start the opening process at this point. And that is exactly the desired aim of the invention for the opening of the pouring device.

If additionally the handle can be folded over on to the flat surface of the closing cap, then the filled and closed container can, according to the invention, be stored with optimum space economy, transported and especially stacked, because there is no somewhat vertical handle protruding from the lid; rather this handle is folded into the plane. This folding over is obtained, as is generally well known, in that after the forming of the lid the moulded-on handle, preferably in the instant when the connecting parts with the closing cap are not yet completely hardened, is folded over on to the flat surface of the closing cap and laid flat. On opening, it is easy for the end user to pull the handle up to a plane vertical to the main plane of the lid in order to carry out the grip and tearing process.

To improve the hygiene of the pouring device, it is envisaged that this should be situated in a depression of the lid. For an advantageous design of the invention it is now planned that this depression of the lid surrounds the whole of the pouring device and is shaped by means of sloped areas in front and a rear wall. This is preferably a small depression (of little height). If one imagines the pouring opening in the lower plane of the depression and the outer surface of the main walls of the lid in an imaginary plane, then the distance between the outer upper plane and the lower or inner plane of the depression containing the pouring opening is small; for a container with a volume of approximately one liter, this would be about 3-6 mm. Such a lid can be manufactured with technically easily managed injection moulding tools. The main plane of the lid is situated on top, i.e. outside and serves as standing surface for the next pack to be stacked on top for transport or storage; while the pouring device itself can also, at least partially, be used as standing surface and support for stacked containers, the handle moulded onto the upper outer part of the closing cap is folded over on to the flat surface of the closing cap, so that the outer measurement resulting after the folding is again equal to the outermost upper plane and therefore forms the standing surface.

Because of the arrangement of the pouring device in the corner of the lid, and especially that the point of the pouring opening is positioned as far as possible into the corner of the lid, one not only obtains a hygenic opening with a good and definite pouring stream, but also the opening is optimally improved, because the container is especially stiff in the corner of the lid. In this corner, i.e. at the point or pouring spout of the pouring opening, the strongest resistance is offered against the tearing forces. Therefore, the effect of the forces when tearing via the strap is beneficial also at the point of the closing cap. Due to the arrangement of the pouring opening in the depression and additionally in the corner of the lid, even the last remainder of fluid can run out when pouring.

It is hereby favourable that the handle is not only connected to the closing cap via the strap but also with a thin plastic skin, as this improves the aligning and positioning of the handle in respect of the closing cap and will hold better during manufacture. On opening the thin skin tears very quickly touching of the handle, so that thereafter the only connection to the closing on cap is the strap. The torn thin plastic connecting skin between lid and closing cap also is a sign that the container had already been opened once before.

For further advantageous development of the invention the closing cap is connected with the lid via a flange, which is surrounded by a weakening line, and on the side opposite the point of the pouring opening by means of a hinged axle is securely anchored to the lid, and or can be locked in the open position by means of a locking mechanism in the lid. The closing cap seals the lid after the manufacture and filling of the container and shall at the same time serve to ensure a possibly dust-proof re-closing after the container was first opened.

Therefore the closing cap is connected to the lid with a flange. The flange runs along in the outer region of the closing cap and its upper or outer flat wall surface along the edge of the pouring opening. Upwards or outside it also reaches into the outer or upper flat wall surface of the closing cap and downwards or towards the inside of the container and extends over a thin connecting edge inwards. This connecting edge is the mentioned weakening line, which connect the flange and therefore also the closing cap with the lid. The weakening line is practically a required break line and directs the tearing forces from the said point of the closing cap, and respectively the point of the pouring opening towards the back to the middle part of the lid to the ends of the above-mentioned hinged axle. If one imagines a line through this axle, then this line will run vertically to the lengthwise direction of the pouring opening or approximately diagonally through the quadrangular lid. With this hinged axle the closing cap is securely attached to the lid, whereby the closing cap is no longer connected only with a more or less loose strap. The closing cap is therefore, also after opening, in a definite position in respect of the pouring opening and can be closed again more easily. Furthermore, it is provided with a notched opening, so that when open it can be locked on to the lid and thus can be kept open. This also improves the handling and pouring of the container as per the invention. The closing cap can be opened with one movement and kept in this position by locking in, so that the user can pour with a second movement without the pouring stream coming into contact with the closing cap, which could be deformed in the case of certain fluids.

Additionally, the invention with regard to the locking mechanism is further characterized in that the locking mechanism has a collar at the outside of the cap and a nose with drop-in hook is attached to the lid opposite. While the aforementioned axle near the flange is connected with the closing cap, the flange forms a stem above the hinged axle, which connects with the hinged axle on the one side and with the collar on the other side. The collar then lies in the outer or upper plane of the cap, but protrudes collar-shaped somewhat above this. Away from this stem, which forms part of the flange on the closing cap, that is towards the middle part of the lid, is the aforementioned rear wall, which also represents the rear border of the depression. The nose is affixed to this rear wall, which is arranged away from the cap, from the rear part of the flange of the closing cap and therefore also from the stem and from the collar which is attached on top and outside of the stem. When the user tips up the closing cap over the hinged axle, then the collar grips under the drop-in hook and bends it out of the way, because the parts consist of plastic and are pliable. After that the drop-in hook returns to its original position and grips behind the collar, so that the closing cap is locked in the open position.

Especially useful is here if the collar has a shoulder attached which, together with the drop-in hook of the nose, can be brought into and out of action by bending. The shoulder is preferably situated on the side of the collar which faces the point of the closing cap and therefore forms a kind of barbed hook to engage the aforesaid drop-in hook of the nose. In order to bring these parts into interaction, they change shape on contact with each other and snap back into their original moulded position, whereby they then reach the locked-in position. In order to get out of this position, the user has only to push the closing cap into the pouring opening in the re-closing position, whereby by means of bending (a kind of power struggle) the drop-in hook and nose are disengaged from each other.

For a preferred design it is further envisaged that the nose is connected with the lid by means of a strengthening rib attached to the rear wall of the depression and that all parts of the locking mechanism remain arranged within the outer contours of the lid. The strengthening rib stiffens the whole construction of the locking mechanism without influencing the elasticity. Additionally, all parts of the locking mechanism are advantageously placed inside the required outer contours, so that no disadvantages can arise as regards transport and storage as well as stacking of several containers.

To improve the re-closing, it is furthermore useful per the invention, if the closing cap is provided with cams in its collar near the point. The cams are placed at intervals of say 3-6 mm from the point of the closing cap towards the back to the inside of the lid and set firmly on to the collar in such a way, that during the pushing in of the closing cap into the pouring opening the cams lock into the boundary edge of the pouring opening and therefore hold the cap tightly in closed position, until by pulling up of the handle the resistance between of the edge of the pouring opening and the cams is overcome and the closing cap has been pulled free.

As per the invention it is also advantageous that the pouring device has a pouring edge, which is molded on the lid next to the point of the pouring opening, whereby the pouring opening is at the lowest part of the depression of the lid in the plane of the pouring edge. Due to the moulding on of the pouring edge in the inner lower plane, i.e. the plane of the depression, the pouring stream will be still more defined and channelled, so that pouring is made even easier for the end user.

Figure 2:
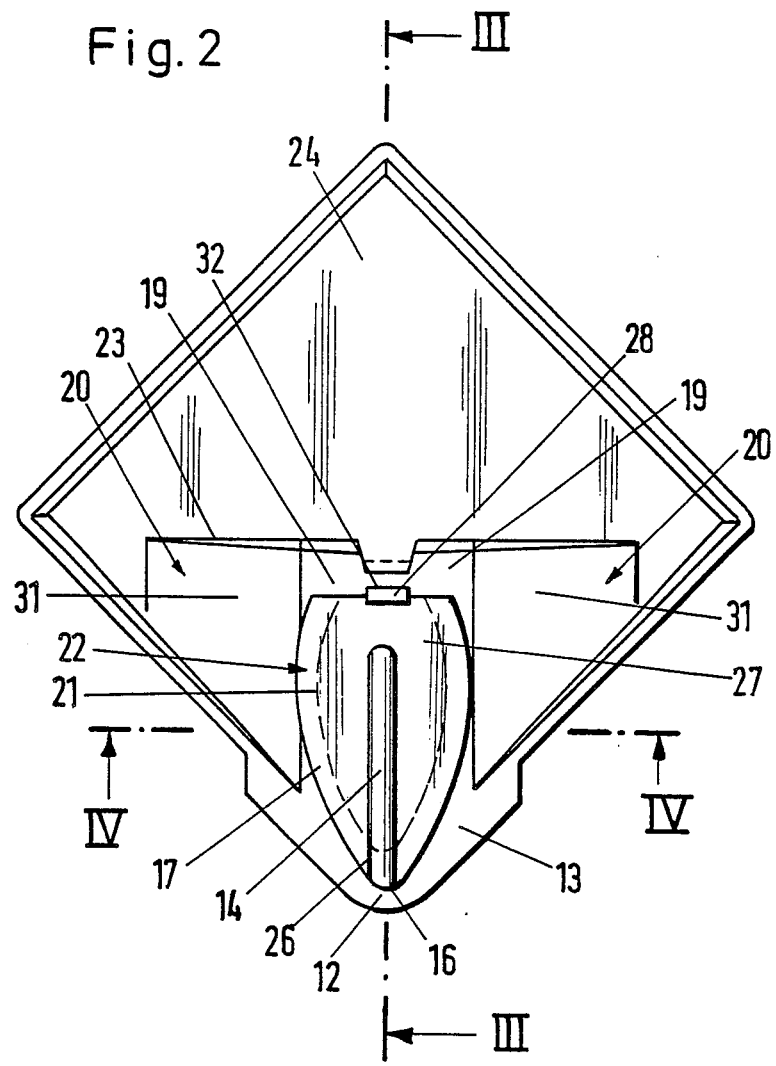
Figure 3:
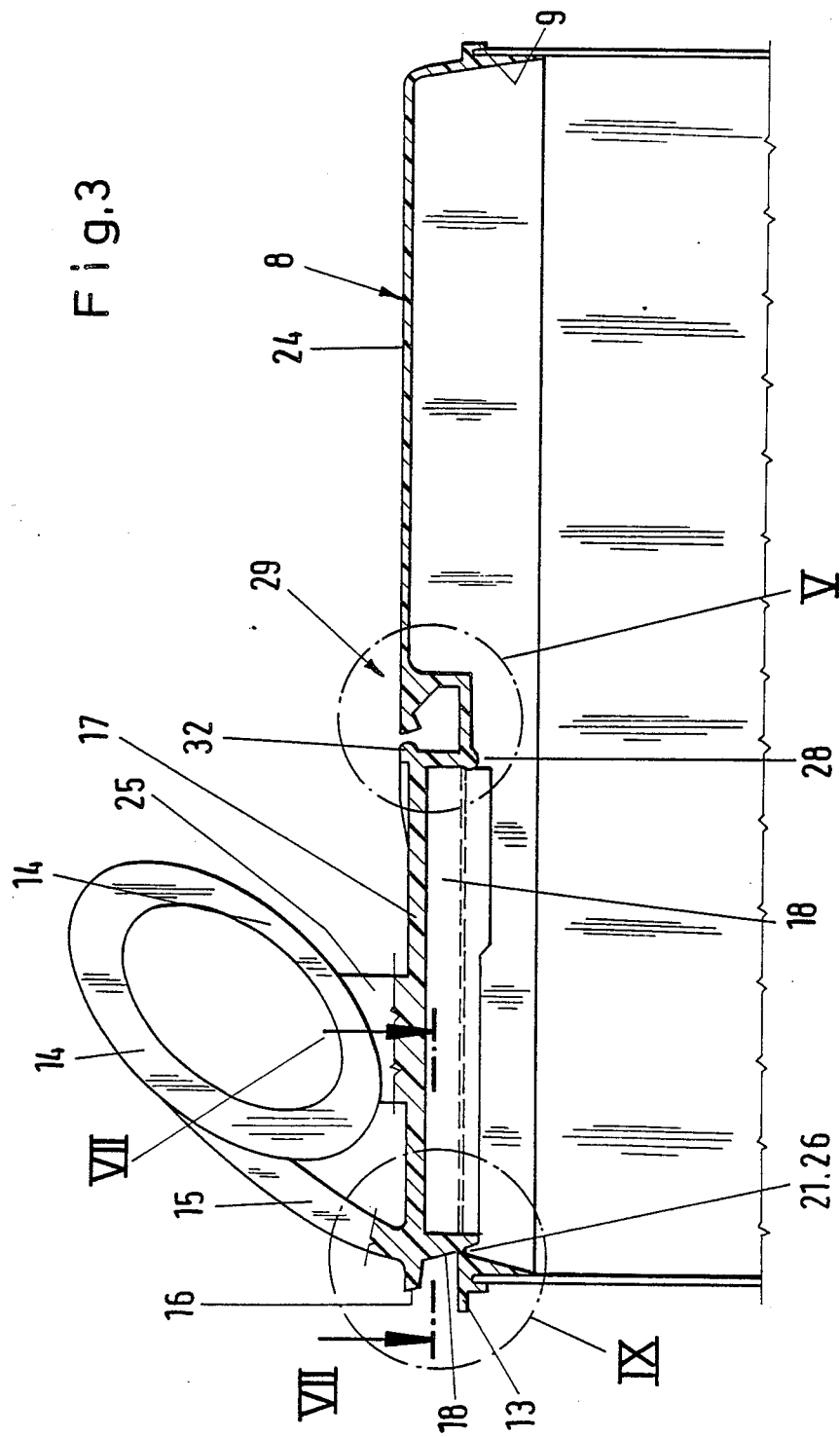
Figure 4:
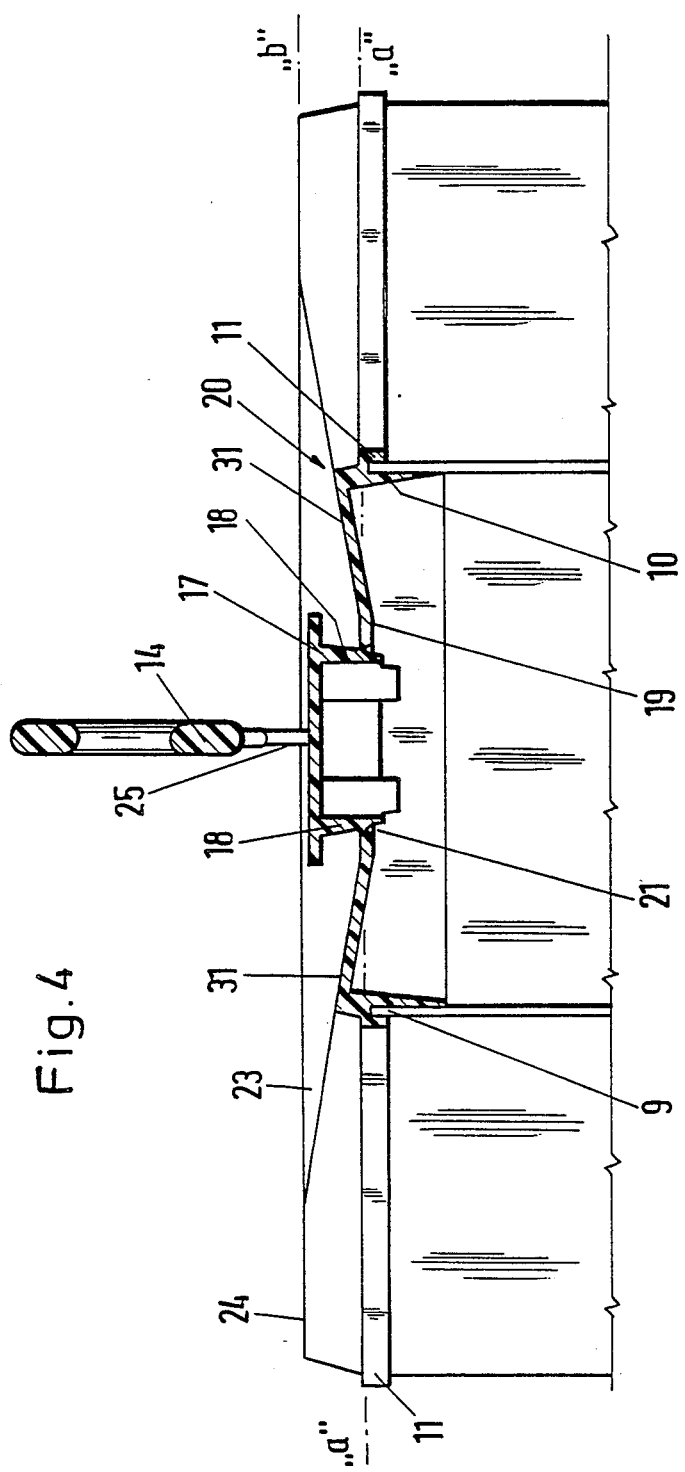
Figure 5:
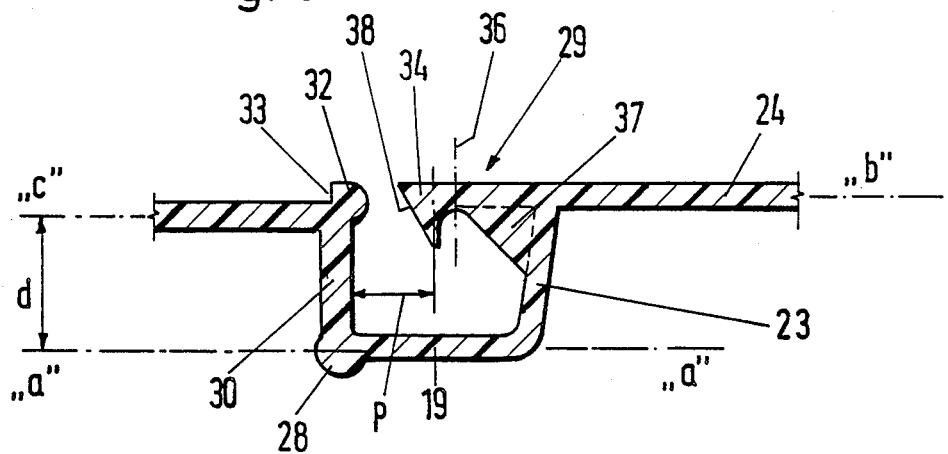
Figure 6:
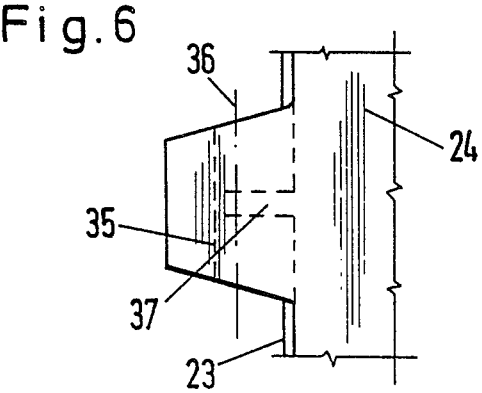
Figure 7:
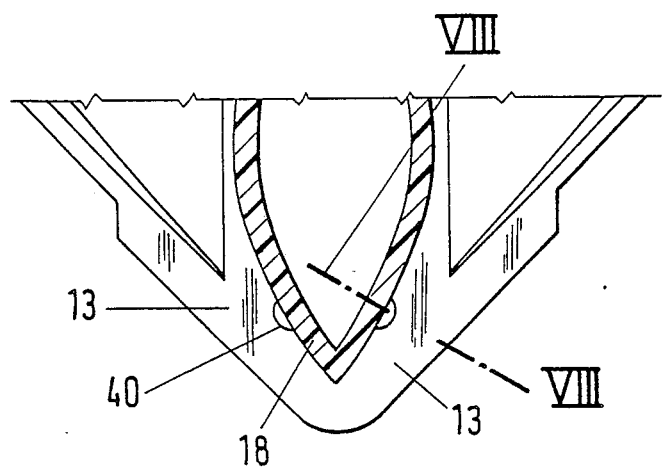
Figure 8:
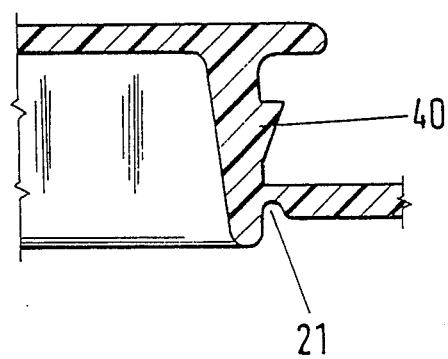
Figure 9:
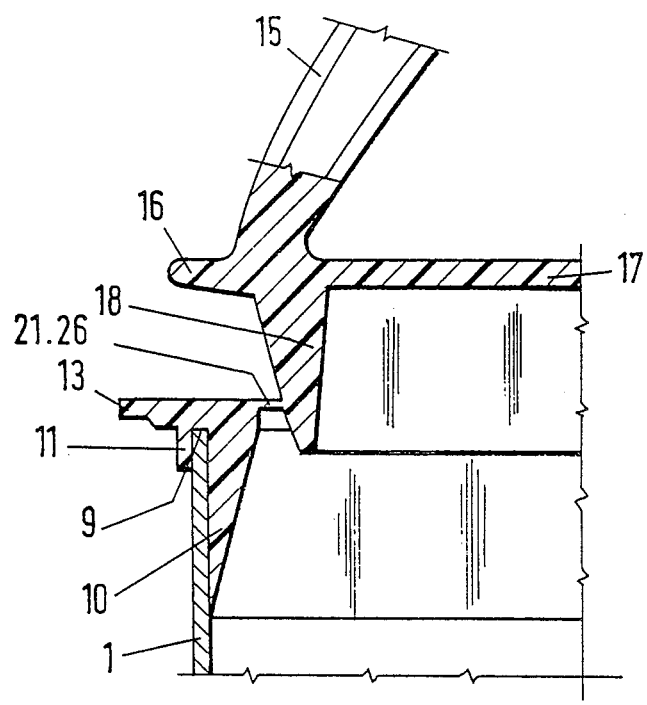

Further advantages, characteristics and applications of the present invention can be seen from the following description of a preferred design example in connection with the drawings. It is shown in:

FIG. 1 the outer view of a container in perspective in the quadrangular shape as envisaged by the invention with view from above on the quadrangular lid, FIG. 2 an enlarged view from above on to the lid, FIG. 3 a cross-section view along the Line III—III in FIG. 2, FIG. 4 A cross-section view along the line IV—IV of FIG.2, FIG. 5 an enlarged detail relevant to the details shown in the dash-dotted circle V in FIG. 3, FIG. 6 cut-off view from above on the detail as per FIG. 5, i.e. if one looks down from above in FIG. 5, FIG. 7 an enlarged and cut-off sectional view along the line VII—VII in FIG. 3, FIG. 8 a cross-section view according to line VIII—VIII in FIG. 7, and FIG. 9 an enlarged and cut-off presentation of the detail taken from the dash-dotted circle IX in FIG. 3.

The presented design shows a container for fluids, which is proposed for the distribution of milk and is shown in perspective in FIG. 1. Of the tube 1, one can see the side wall 2 on the left and the the side wall 3 on the right, whereby the longitudinal sealing weld is placed at the edge 5 in the plane of the side wall 3.

While the edge 5 divides side walls 2 and 3, the side wall 2 is also limited by the edge 6 toward the left, and side wall 3 by the edge 7 towards the right. The bottom, which is formed by folding of triangular flaps and a cross sealing weld, is not shown and therefore has no reference number. Its formation and design is well known from other containers. The lid opposite the bottom is shown "from above" in the present description and referenced with 8. It consists of thermoplastic material without supporting material and is injection molded along the upper edge 9 (FIGS. 3, 4 and 9) of the tube 1. As one can see from FIGS. 3, 4 and especially 9, the free upper edge 9, which initially due to the cutting is not covered with plastic material, is completely surrounded with the moulded thermoplastic material of the lid 8, and that is on the inside of the tube 1 with a conically tapering flange 10 and towards the outside with a protective ridge 11. This eliminates fluid penetrating from any side into the plastic-free upper edge 9 and thus destroying it by swelling.

The lid 8, molded in this way to the upper edge 9 of the tube 1, has four corners when viewed from above which can be clearly seen in FIG. 2, whereby at the (here so named) "front" corner 12 a pouring edge 13 has been moulded on, which goes completely around the corner 12. From the outside one can also see clearly the handle 14 with the strap 15, which is molded on to the closing cap 17 at the front near the lid corner 12 at the point 16. The closing cap is molded on by means of a flange 18 at the lower wall area 19 (FIG. 4) of a depression 20 along a weakening line 21 (FIGS. 3, 4 8 and 9). The depression 20 as seen from above in FIG. 2 is situated in the lower or front area, together with the pouring device generally referenced with 22, while as per FIG. 2 over, i.e. behind the rear wall 23 lies the outer or upper wall area 24. From FIG. 2 can be seen that the larger area of the lid 8 is covered by the upper wall area 24 which, when the handle 14 is folded down, serves as standing and support surface for the next container for stacking, storage and transport.

When the end user holds the container for opening and grips the handle 14, which is connected to the closing cap 17 by means of a thin skin 25 (FIGS. 3 and 4), and then pulls the handle as per FIG. 3, then the thin skin 25 will tear without undue force, often already when lifting the handle from the folded position on the closing cap 17, a position not shown in the figures. Thereafter the whole traction in the direction of strap 15 acts on the point 16 of the closing cap 17 and is then directed to the area — marked 21 in FIG. 3, of the weakening line (which is also marked 21), so that the strongest tearing force is applied there and the tearing process can begin. At this location also lies the point 26 (FIGS. 2, 3 and 9). The dashed weakening line 21 (FIG. 2) which starts at this point 26, defines the limits of the pouring opening 27, which is included in FIG. 2, although in the figures the closing cap 17 is not torn out and therefore the pouring opening is not shown as viewed from above.

On the side opposite the point 26 of the pouring opening 27, i.e. at the ends of the weakening line 21, there is the hinged axle 28 together with the locking mechanism generally referenced as 29, which is described in more detail in FIGS. 5 and 6.

This locking mechanism 29 is marked with the dash-dotted circle V and shown in more detail with cross-section view in FIG. 5 as well as in FIG. 6 as viewed from above. One can recognise always in the right-hand part of these sketches the upper wall area 24, the rear wall 23 at the transition point to the depression 20 and the hinged axle 28. The axle is only as wide as the space between the lines of the weakening line 21, which ends at the back in the middle of the lid, in the case of the design example shown here for a one liter milk container, as small as 8 mm. It has already been mentioned that a flange 18 is moulded on along the weakening line 21 at the closing cap 17. This flange tapers towards the front and ends at the point 26 of the pouring opening 27. Towards the back in the direction of the middle of the lid it ends in a stem 30, which connects the hinged axle 28 from the inner or lower plane "a" (FIGS. 4 and 5) to the so-called "middle plane" "c" (FIG. 5) over the space d, i.e. into the plane "c" of the wall area of the closing cap 17. Therefore, like the body of a boat if viewed from above, under this middle area of the wall, the closing cap 17 is surrounded by a flange in the form of flange 18 and the stem 30, like a closed loop.

The lower wall area 19 (FIG. 4) extends on both sides of the closing cap (17). from approximately the front of the pouring edge 13 to the rear wall 23, therefore, FIG. 5 shows on the right of the hinged axle 28 a part of the lower wall area 19. This is also indicated in the view from above in FIG. 2. On both sides of the lower wall area 19, as per FIG. 2, a frontal sloping field 31, which is approximately trapezed shaped, joins towards the right and towards the left.

At the upper rear edge of the closing cap 17 a collar 32 is moulded on which is provided with a shoulder 33 on the side facing the closing cap. Opposite this collar 32 with shoulder 33 at the distance of "p" there is a nose 34 with drop-in hook 35, the tip of which, according to FIG. 5, is pointed downwards, and in the presentation in FIG. 6 is shown again as a dashed line. In FIG. 6, the dash-dotted line 36 next to the nose on the right marks, as indicated in FIG. 5, a thin part behind the nose 34 towards the rear wall 23, whereby the nose 34 is pliably hinged to the rear wall 23. A strengthening rib 37 supports the nose 34 against the rear wall 23 and somewhat strengthens the nose, which protrudes from the rear wall 23 towards the closing cap 17.

In operation, the locking mechanism 29, after the pouring device 22 has been torn open and the pouring opening 27 has been laid free, works in such a manner that the closing cap is swivelled upward towards the right around the hinged axle 28, as per FIG. 5, the collar 32 with the shoulder 33 pushes in clockwise direction towards the right against the sloping surface 38 of the nose 34, and therefore the nose 34 bends slightly towards the right and upwards until the shoulder 33 locks in behind the drop-in hook 35. In the same instant, also the highly bent nose 35 snaps back again into the end form position as per FIG. 5, and then the closing cap is arrested in the open position. As all parts consist of thermoplastic material, it is understood, that for reclosing the user needs only to exercise a small pressure with the finger to cause the nose 34 with the drop-in hook 35 to bend again and to let go, so that the shoulder 33 becomes disengaged from the drop-in hook 35. After that the closing cap 17 by means of the flange 18 can easily be directed into the pouring opening 27.

If additionally, as shown in FIGS. 7 and 8, cams 40 are affixed at flange 18 at the distance from the point 26 of the pouring opening 27, then a quite firm hold is made possible by pushing the closing cap in the pouring opening 27. The pouring device 22 is then not only dust-free but also to a certain degree even leakproof; at least as far as spillage during short tilting of the reclosed container is concerned.

After manufacture, filling and closing of the container the handle 14 will be folded from the position shown in the example in FIGS. 3 and 4 (vertical position) into the horizontal. Therefore also the handle 14 fits into the volume within the whole outer contours of the container, i.e. under the outer wall area 24, which lies in the so-called upper plane "b". The upper surface of the folded handle 14 then comes to lie in the plance "b", so that not only the upper wall area 24 but also the closing cap 17 with the handle 14 serves as standing surface for containers stacked above.

For left-handed users, with regard to FIG. 1, the longitudinal sealing weld 4 would not be arranged next to the edge 5, but at the edge diametrically diagonal opposite, which in FIG. 1 is the only longitudinal edge not referenced. The normal end user, however, is considered to be right-handed, who would hold the container in his right hand for pouring. This user will place the thumb of the right hand approximately at middle height near the edge 5, while the other four fingers of the right hand rest on the rear side wall not shown, i.e. direct behind tube edge 7. The thumb, due to the small area, exercises the greatest pressure and the container should be especially stiff. When the longitudinal sealing weld 4 lies in the plane of the side wall 3 and next to the tube edge 5, then the expert recognises at once that in the direction of the thumb the greatest stiffening is provided. This is still increased, because the direction of the paper fibers of the tube 1 run crosswise to the longitudinal sealing weld 4.

I claim:

1. In a container comprising a tubular body having first and second ends, a container bottom wall at said first end, and a lid with a pouring opening affixed to said second end in which the uppermost surface of said lid defines a plane which is parallel with said bottom wall, and a pouring device comprising closing means for said pouring opening, pull means for removing said closing means from said pouring opening and a depression in said lid in the region surrounding said pouring opening, the improvement which comprises hinged means for locking said closing means for said pouring opening in an open position, said hinged locking means comprising first and second engaging elements, said first engaging element comprising a stationary projection extending horizontally from the lid toward said closing means for said pouring opening, said second engaging element comprising a projection on said closing means which is in a plane substantially even with said first engaging element, said first and second engaging elements being adapted so as not to protrude transversally through the plane of said lid when the container is closed.

2. The container of claim 1 wherein the first engaging element comprises hooking means and the second engaging element comprises grooved means for interlocking with said hooking means.

3. The container of claim 2 wherein the groove means comprises a projecting bead located on the closing means and the hooking means comprises a releasable drop-in-hook adjacent to said bead.

4. The container of claim 1 wherein said tubular body and container lid are quadrangular shaped.

5. The container of claim 4 wherein the quadrangular shaped tubular body is comprised of a thermoplastic coated fibrous supporting material, a longitudinal sealing seam and a lid injection molded to said tubular body.

6. The container of claim 5 wherein the longitudinal sealing seam is stiffened and the fibrous supporting material comprises paper fibers running transverse to the longitudinal axis of the sealing seam.

7. The container of claim 4 wherein said pouring device is located at an edge in one corner of said quadrangular shaped lid, said hinged closing means comprising a cap with a peripheral edge, said cap being tapered toward and adjacent to the edge of said corner.

8. The container of claim 7 including a pouring edge at the corner of the lid having said pouring device.

9. The container of claim 8 wherein the longitudinal sealing seam is located in proximity to a corner of said quadrangular shaped tubular body which corner is adjacent to said corner which is closest to said pouring device.

10. The container of claim 7 wherein the depression in the lid is located in the corner having the pouring opening and hinged cap, said depression comprising sloping areas immediately surrounding said pouring opening.

11. The container of claim 7 including in combination flange means and tearable sealing means on the peripheral edge of the cap for sealing and welding the pouring opening closed, said cap being hinged at one end to the depression in said lid.

12. The container of claim 11 including pull means affixed to the peripheral edge of said cap closest to the edge of the corner and opposite the end hinged to the lid for lifting said cap.

13. The container of claim 12 wherein the first engaging element comprises hooking means and the second engaging element comprises a grooved means for interlocking with said hooking means.

14. The container of claim 13 wherein the groove means is comprised of a projecting bead located on the cap and the hooking means comprises a releasable drop-in-hook adjacent to said bead.

* * * * *